United States Patent [19]

Matsuo

[11] Patent Number: 5,426,728
[45] Date of Patent: Jun. 20, 1995

[54] METHOD FOR TRANSFORMING FORM DRAWINGS INTO MECHANISM CONCEPTIONAL DRAWINGS

[75] Inventor: Eiji Matsuo, Nagaokakyo, Japan

[73] Assignee: Mitsubishi Denki Kabushiki Kaisha, Tokyo, Japan

[21] Appl. No.: 849,380

[22] PCT Filed: Sep. 18, 1991

[86] PCT No.: PCT/JP91/01237

§ 371 Date: Jul. 20, 1992

§ 102(e) Date: Jul. 20, 1992

[87] PCT Pub. No.: WO92/05506

PCT Pub. Date: Apr. 2, 1992

[30] Foreign Application Priority Data

Sep. 18, 1990 [JP] Japan .................. 2-250498
Sep. 2, 1991 [JP] Japan .................. 3-221522

[51] Int. Cl.6 ............................. G06F 15/62
[52] U.S. Cl. ...................... 395/155; 395/161; 395/133; 395/141
[58] Field of Search ........ 395/133, 135, 136, 140–143, 395/119, 120, 152, 155, 161; 382/8, 10

[56] References Cited

U.S. PATENT DOCUMENTS 4,388,610  6/1983  Tsunekawa .............. 382/8
4,813,013  3/1989  Dunn ..................... 395/159
4,858,150  8/1989  Aizawa et al. ........... 395/120
4,949,388  8/1990  Bhaskaran ............... 382/10

FOREIGN PATENT DOCUMENTS 1-291379  11/1989  Japan .

OTHER PUBLICATIONS

Higdon et al. Engineering Mechanics (1955).
"The Patent" vol. 42, No. 11, p. 2, Right column, lines 12–26 1989.
"Machine Design" vol. 34, No. 12, pp. 84, 86 & 88. Dec. 1990.
"Machine Design" vol. 35, No. 1, pp. 82–83, Jan. 1991.

*Primary Examiner*—Almis Jankus

[57] ABSTRACT

A mechanism conceptional drawing transformation method for transforming a form view of a mechanical structure into a mechanism conceptional view including mechanical operations and power transmission paths so as to understand the operations in a short time. The mechanical operations and the power transmission paths in the form view are recognized and are further decomposed into a plurality of grouped blocks. In every block, components are symbolized and are transformed into predetermined conceptional symbols in advance, and then these conceptional symbols are connected with segments. Thus the obtained conceptional view line connection view is expressed as a perspective view, and operational symbols for exhibiting the entire power transmission paths are added to the perspective view.

7 Claims, 24 Drawing Sheets

Fig. 14
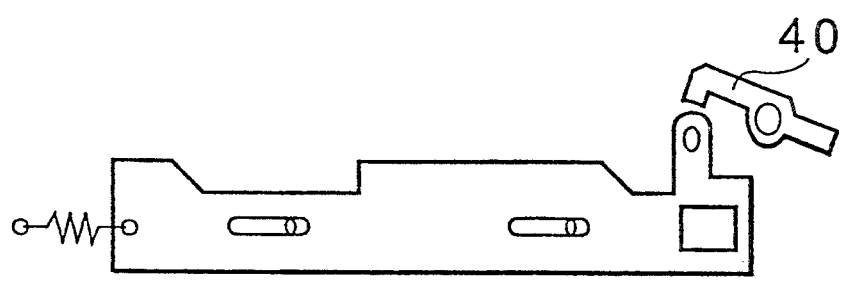
Fig. 15
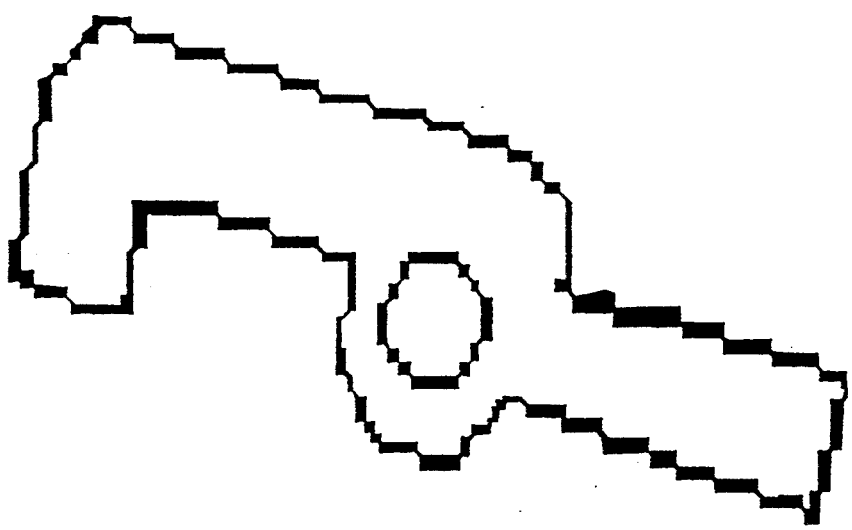

FIG. 18
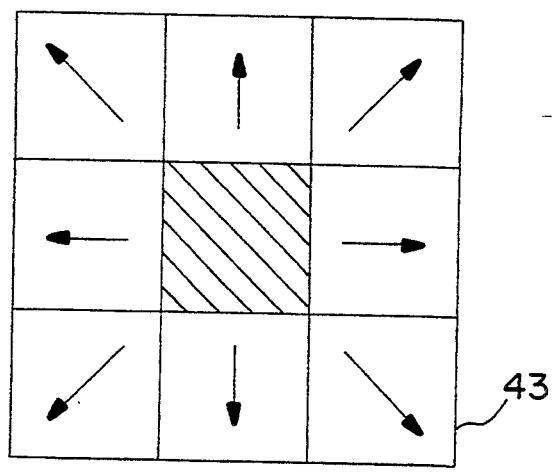
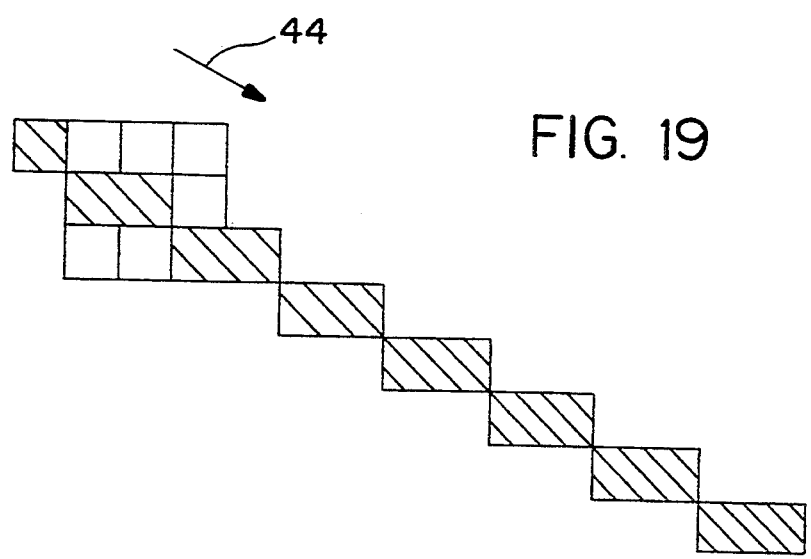
FIG. 19

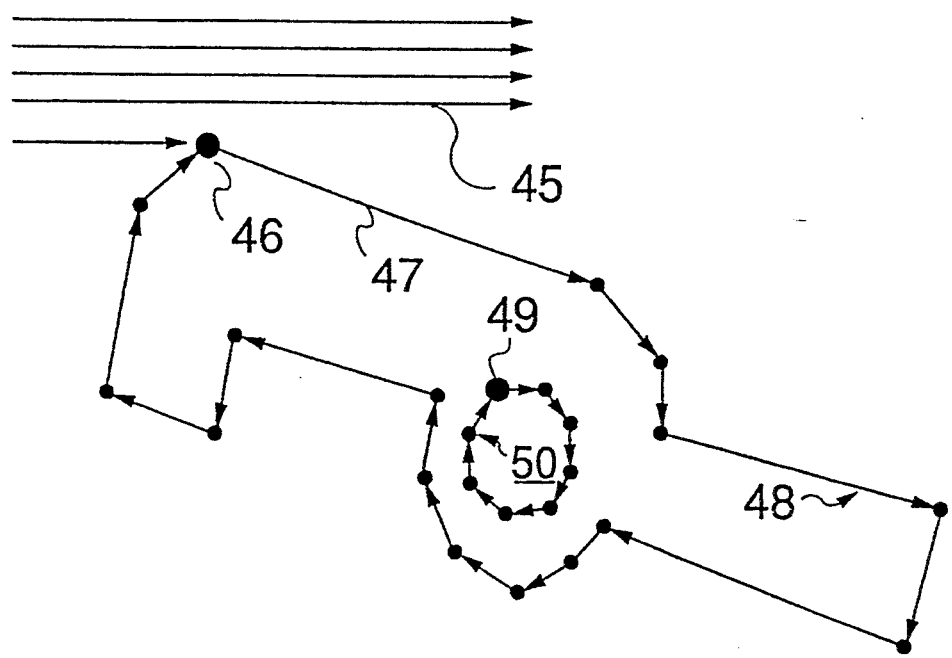
Fig. 21
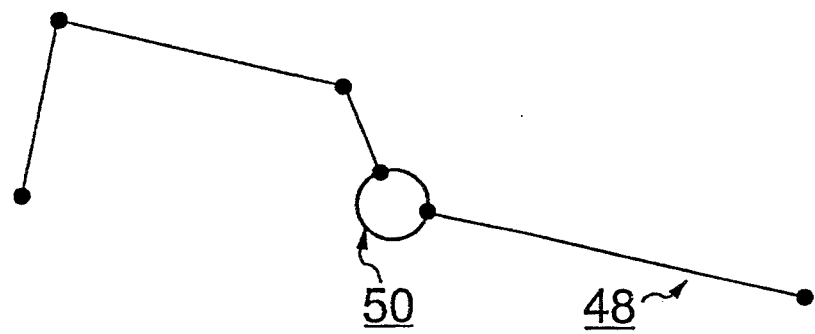

METHOD FOR TRANSFORMING FORM DRAWINGS INTO MECHANISM CONCEPTIONAL DRAWINGS

TECHNICAL FIELD

The present invention relates to a mechanism conceptional drawing transformation method for transforming form drawings of a structure of a machine or apparatus into mechanism conceptional drawings in order to readily understand an operation of the machine or apparatus.

BACKGROUND ART

Conventionally, as means for exhibiting an operation of a machine or apparatus, trigonometric views represented by elevational, plan and side views, an exploded view, a perspective view, an operational view composed thereof aligned in operational order, and the like have been used for illustrating the structure and the shape of the machine or apparatus, and the operation of the machine or apparatus has been explained by using such views showing the exact form of the actual machine or apparatus. Further, in order to compensate for problems when using the above-described views, a proposal for expressing mechanism drawings by using conceptional drawings as a conception approximate drawing method has been partly dealt with in, for example, "Ascending Air Current" of THE PATENT, Vol. 42, No. 11, the Patent Attorney Association, November, 1989. However, the process of how to specifically transform the form drawings into the conceptional drawings is not proposed in detail, and thus it is quite difficult to actually carry out the drawing transformation operation.

As described above, in the conventional drawing transformation method, since the views drawn on the basis of the form drawings illustrating the actual structure of the machine are used, only the expression of the machine form is emphasized, and it is not enough to understand the operation of the machine. Also, the essential points of the operation of the machine can not be explained well.

In order to overcome the aforementioned problems, there is provided the present invention, and it is an object of the present invention to provide a mechanism conceptional drawing transformation method capable of transforming conventional form drawings of a machine structure into mechanism conceptional drawings as a drawing method capable of readily understanding an operation of the machine in a short time.

DISCLOSURE OF INVENTION

A mechanism conceptional drawing transformation method according to the present invention comprises the steps of: a recognition step for recognizing mechanical operations and power transmission paths from a form view in order to transform the form view of a mechanical structure into a mechanism conceptional view in which components are symbolized; a decomposition step for decomposing the recognized mechanical operations into a plurality of groups; a symbolization step for symbolizing the components which cause or carry out the decomposed mechanical operations according to a predetermined symbol; a line connection step for connecting the symbolized components by segments corresponding to a form of the mechanical structure to assemble a line connection view; a perspective view formation step for expressing the assembled line connection view as a perspective view; and an operational symbol addition step for adding operational symbols exhibiting operational directions to the component symbols.

In the method of the invention, the recognition step for recognizing mechanical operations and power transmission paths from a form view includes: a form image reading step for inputting an image of the form view of the mechanical structure drawn on a paper into a computer; an invisible line restoration step for restoring invisible lines of overlapped parts of the read view; and a decomposition instruction step for recognizing the power transmission paths between the parts by an operator and instructing a decomposition of the figure to the computer.

In a further aspect of the invention, the decomposition step for decomposing the recognized mechanical operations into a plurality of groups includes: a figure decomposition step for decomposing the figure according to decomposition instruction data; a line thinning step for transforming image data of the decomposed figure into a thin line; a line tracking step for tracking the thin line to recognize a connection of the segments; and a vector data formation step for transforming the connected segments into vector data composed of start and end points.

The method includes a symbolization step for symbolizing the components for causing the decomposed mechanical operations which includes: a figure recognition step for recognizing the figures; a figure line drawing formation step for simplifying the figures into wire forms; a figure connection state instruction step for recognizing a connection state between the figures by an operator and instructing the connection state to the computer; a conceptional symbol selection step for selecting conceptional symbols exhibiting operational conceptions caused by a plurality of combinations of components; and a conceptional symbol arrangement step for arranging and drawing the conceptional symbols.

A further aspect of the invention may be a line connection step for connecting the component symbols by the segments corresponding to the form of the mechanism structure to form the line connection view including: a conceptional symbol connection recognition step for recognizing a connection between the conceptional symbols; and a conceptional symbol line connection step for connecting the conceptional symbols by the segments.

In a preferred embodiment the method, the perspective view formation step for expressing the formed line connection view as the perspective view includes: a perspective view coordinates transformation step for transforming coordinates of a two-dimensional line connection view; and a perspective view drawing step for drawing a perspective view from the transformed data.

In another preferred feature of the method, the operational symbol addition step for adding the operational symbols exhibiting the operational directions to the component symbols includes: an operational symbol selection step for selecting arrows for exhibiting directions of the operations; an operational symbol arrangement step for drawing the selected operational symbols; and an operational relation instruction step for indicating a relationship between the operational symbols and the conceptional symbols.

In the mechanism conceptional drawing transformation method according to the present invention, by processing in order the recognition step, the decomposition step, the symbolization step, the line connection step, the perspective view formation step and the operational symbol addition step, the conceptional view is formed from the form view of the mechanical structure. In the recognition step of the mechanism conceptional drawing transformation method according to the present invention, by processing in order the form image reading step, the invisible line restoration step and the decomposition instruction step, the recognition of the form view is performed. In the decomposition step of the mechanism conceptional drawing transformation method according to the present invention, by processing in order the figure decomposition step, the line thinning step, the line tracking step and the vector data formation step, the decomposition of the recognized form view is performed.

In the symbolization step of the mechanism conceptional drawing transformation method according to the present invention, by processing in order the figure recognition step, the figure line drawing formation step, the figure connection state instruction step, the conceptional symbol selection step and the conceptional symbol arrangement step, the symbolization of the decomposed form view is performed. In the line connection step of the mechanism conceptional drawing transformation method according to the present invention, by processing in order the conceptional symbol connection recognition step and the conceptional symbol line connection step, the connection between the conceptional symbols with tile segments is performed.

In the perspective view formation step of the mechanism conceptional drawing transformation method according to the present invention, by processing in order the perspective view coordinates transformation step and the perspective view drawing step, the perspective view of the conceptional symbol view is expressed. In the operational symbol addition step of the mechanism conceptional drawing transformation method according to the present invention, by processing in order the operational symbol selection step, the operational symbol arrangement step and the operational relation instruction step, the operational symbols are added to the conceptional view.

BRIEF DESCRIPTION OF DRAWINGS

FIG. 14 is an exploded view of a lever of the brake control block of the reel brake motion device shown in FIG. 10.

FIG. 15 is an enlarged view of a lever of the reel brake motion device shown in FIG. 10.

FIG. 18 is a view for explaining a line tracking process.

FIG. 19 is a view for explaining a line tracking process.

FIG. 20 is a view for explaining a vector formation process.

FIG. 21 is a view for explaining a process for transforming a figure into a line drawing.

BEST MODE FOR CARRYING OUT THE INVENTION

First Embodiment

One embodiment of a mechanism conceptional drawing transformation method according to the present invention will now be described in connection with the accompanying drawings.

Figure 1:
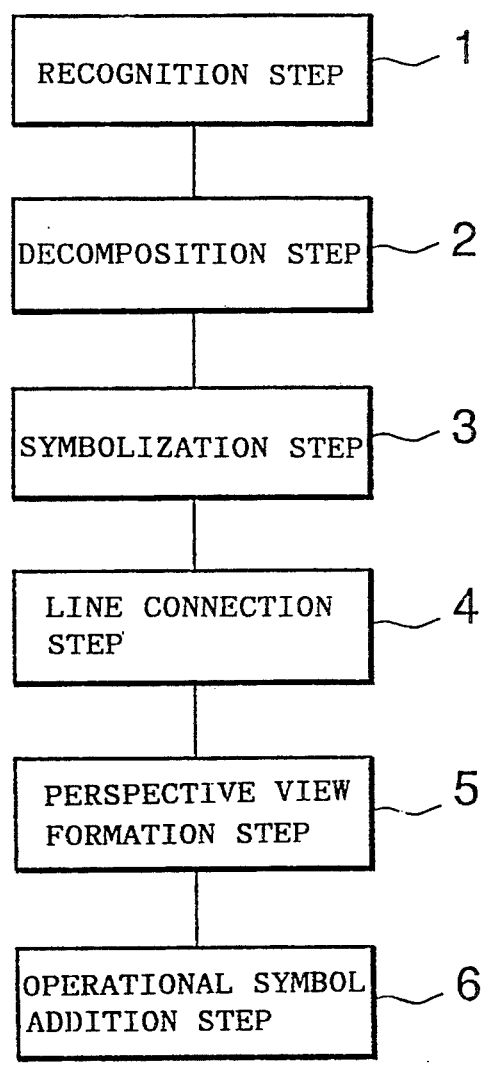
FIG. 1 is a flow diagram of a mechanism conceptional drawing transformation method according to the present invention.

FIG. 1 shows a process for forming a mechanism conceptional view including symbolized components from a form view or views of a mechanical structure. The formation of a mechanism conceptional view includes a recognition step 1 for recognizing mechanism operations and power transmission paths from a form view or views, a decomposition step 2 for decomposing the understood mechanism operations into a plurality of groups, a symbolization step 3 for symbolizing the components for driving the decomposed mechanism operations, a line connection step 4 for connecting the component symbols by segments corresponding to the form of the mechanism structure to form a line connection view, a perspective view formation step 5 for expressing the formed line connection view as a perspective view, and an operational symbol addition step 6 for adding operational symbols exhibiting operational directions to the component symbols.

Figure 2:
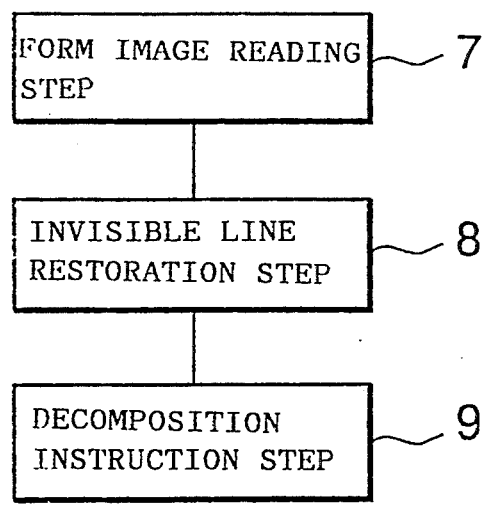
FIG. 2 is a flow diagram of an understanding step of the mechanism conceptional drawing transformation method according to the present invention.

FIG. 2 illustrates the recognition step 1 for recognizing the mechanism operations and the power transmission paths from the form view or views. The recognition step 1 includes a form image reading step 7 for inputting an image of the form view of the mechanical structure drawn on a paper into a computer, an invisible line restoration step 8 for restoring invisible lines of overlapped parts of a view read in, and a decomposition instruction step 9 for recognizing the power transmission paths between the parts by an operator and instructing the decomposition of the figure to the computer.

Figure 3:
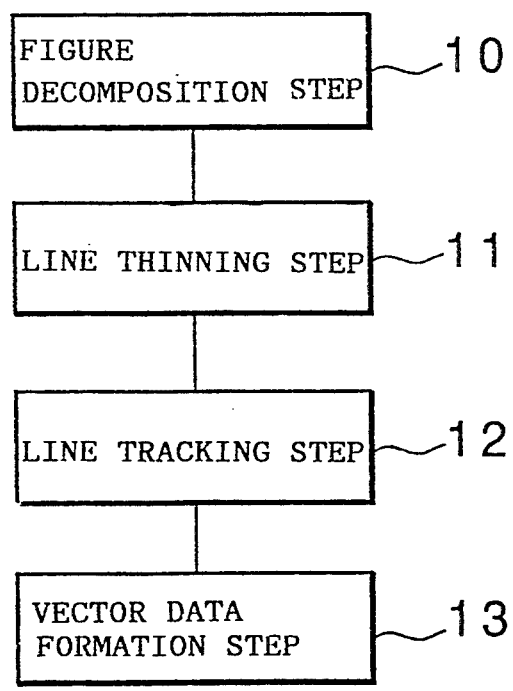
FIG. 3 is a flow diagram of a division step of the mechanism conceptional drawing transformation method according to the present invention.

FIG. 3 shows the decomposition step 2 for decomposing the understood mechanism operations into a plurality of groups. The decomposition step 2 includes a figure decomposition step 10 for decomposing the figure according to decomposition instruction data, a line thinning step 11 for transforming the image data of the decomposed figure into a thin line, a line tracking step 12 for tracking the thin line to recognize the connection of the segments, and a vector data formation step 13 for transforming the connected segments into vector data composed of the start and end points.

Figure 4:
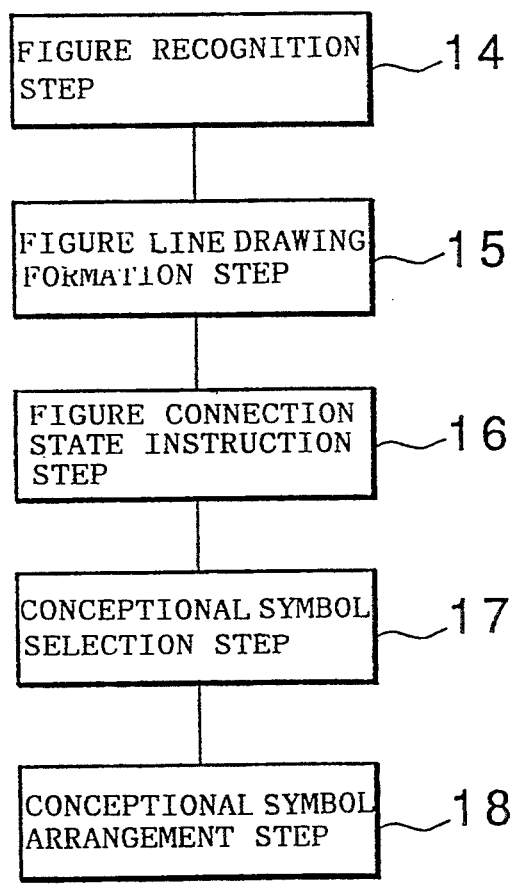
FIG. 4 is a flow diagram of a symbolization step of the mechanism conceptional drawing transformation method according to the present invention.

FIG. 4 shows the symbolization step 3 for symbolizing the components for driving the decomposed mechanism operations. The symbolization step 3 includes a figure recognition step 14 for recognizing the Figures, a figure line drawing formation step 15 for simplifying the figures into wire forms, a figure connection state instruction step 16 for recognizing the connection state between the figures by an operator and instructing the connection state to the computer, a conceptional symbol selection step 17 for selecting conceptional symbols exhibiting operational conceptions caused by a plurality of combinations of components, and a conceptional symbol arrangement step 18 for arranging and drawing the conceptional symbols.

Figure 5:
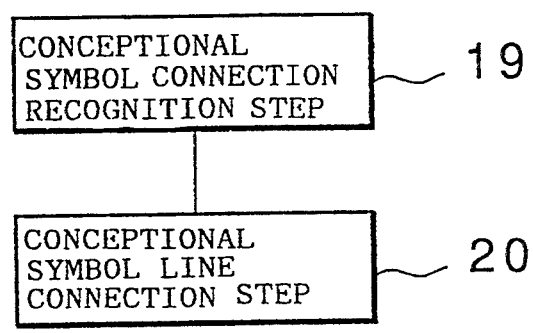
FIG. 5 is a flow diagram of a line connection step of the mechanism conceptional drawing transformation method according to the present invention.

FIG. 5 illustrates the line connection step 4 for connecting the component symbols by the segments corresponding to the form of the mechanism structure to form the line connection view, and includes a conceptional symbol connection recognition step 19 for recognizing the connection between the conceptional symbols, and a conceptional symbol line connection step 20 for connecting the conceptional symbols by the segments.

Figure 6:
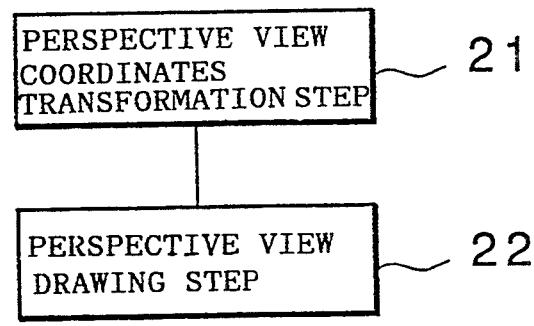
FIG. 6 is a flow diagram of a perspective view formation step of the mechanism conceptional drawing transformation method according to the present invention.

FIG. 6 shows the perspective view formation step 5 for expressing the formed line connection view as the perspective view, and includes a perspective view coordinates transformation step 21 for transforming coordinates of a two-dimensional line connection view, and a perspective view drawing step 22 for drawing a perspective view from the transformed data.

Figure 7:
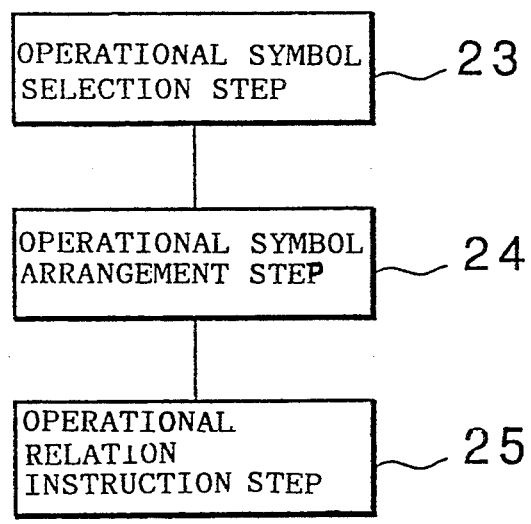
FIG. 7 is flow diagram of an operational symbol addition step of the mechanism conceptional drawing transformation method according to the present invention.
Figure 8:
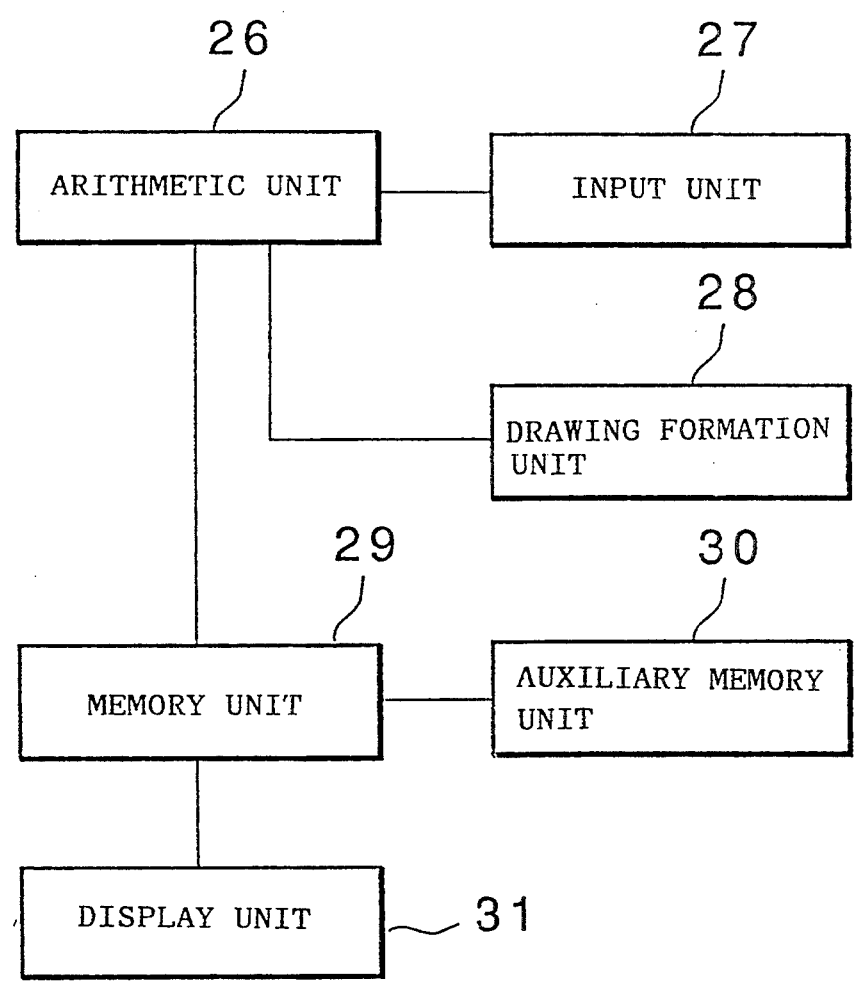
FIG. 8 is a block diagram of the hardware of a mechanism conceptional drawing transformation apparatus to which the present invention is applied.

FIG. 7 shows the operational symbol addition step 6 for adding the operational symbols exhibiting the operational directions to the component symbols. The operational symbol addition step 6 includes an operational symbol selection step 23 for selecting arrows for exhibiting the directions of the operations, an operational symbol arrangement step 24 for drawing the selected operational symbols, and an operational relation instruction step 25 for indicating the relationship between the operational symbols and the conceptional symbols to the conceptional view. FIG. 8 illustrates a structure of a mechanism conceptional view transformation apparatus for forming a mechanism conceptional views having the symbolized components from the form views of the mechanical structure, which comprises an arithmetic unit 26, an input unit 27, a drawing formation unit 28, a memory unit 29, an auxiliary memory unit 30 and a display unit 31.

Figure 9:
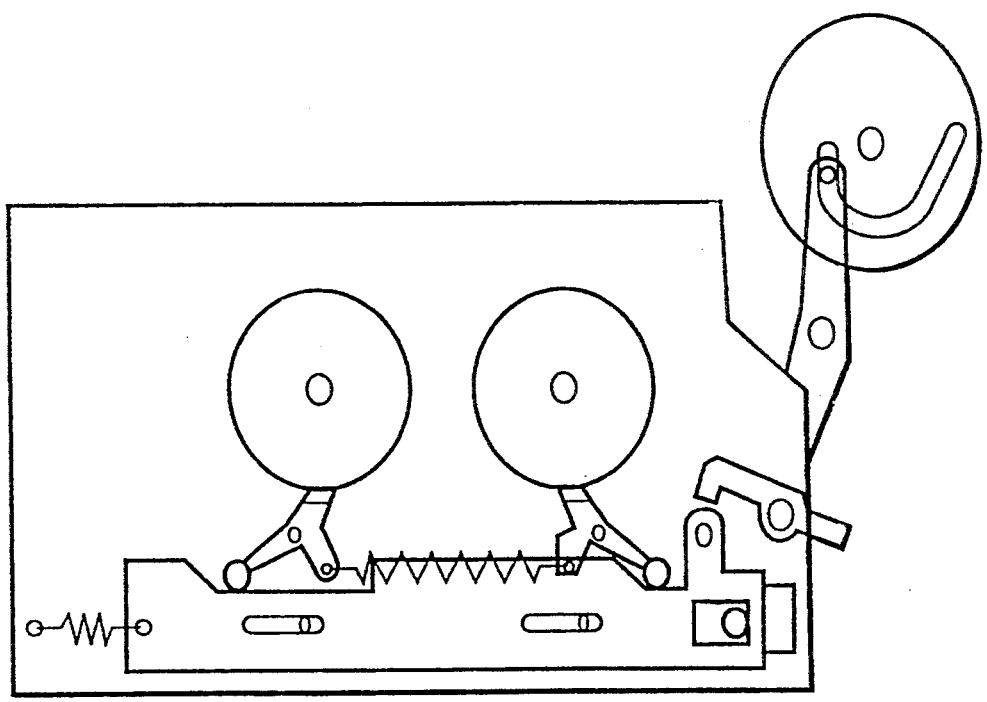
FIG. 9 is a structural view of a reel brake motion device of a magnetic tape recording and reproducing device which utilizes the present invention.
Figure 10:
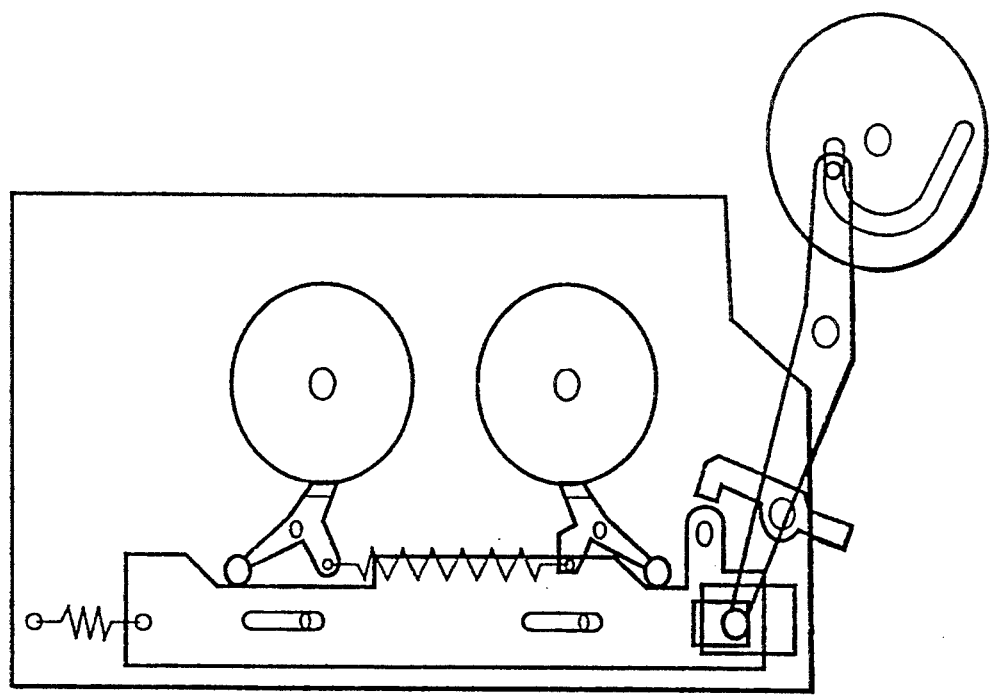
FIG. 10 is a structural view overwritten of the reel brake motion device of the magnetic tape recording and reproducing device shown in FIG. 9.
Figure 11:
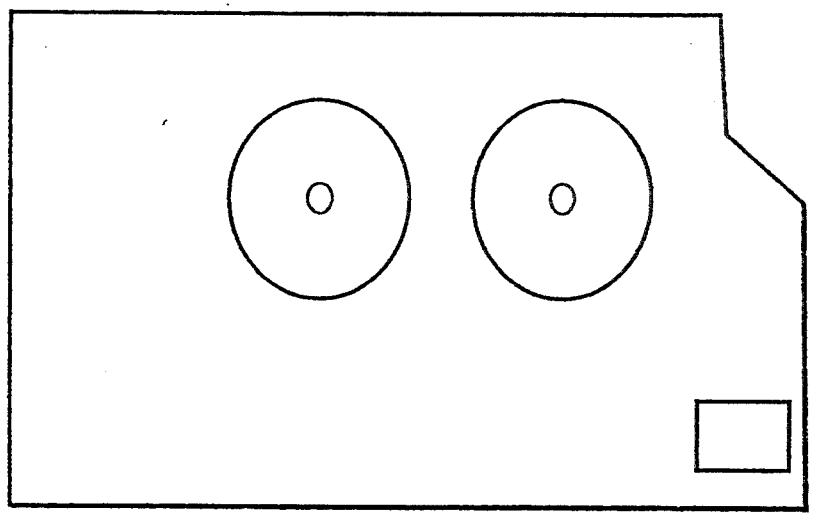
FIG. 11 is an exploded view of a reel block of the reel brake motion device shown in FIG. 10.
Figure 12:
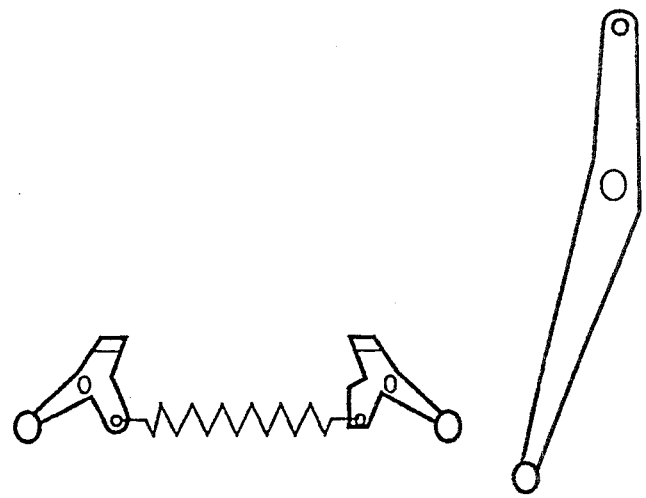
FIG. 12 is an exploded view of a reel brake block of the reel brake motion device shown in FIG. 10.
Figure 13:
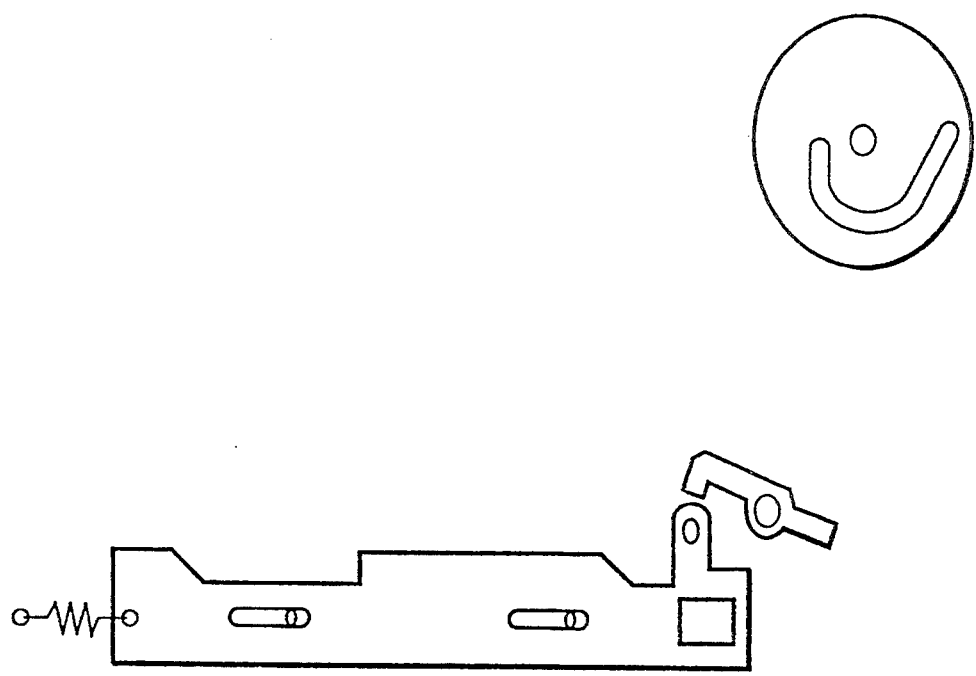
FIG. 13 is an exploded view of a brake control block of the reel brake motion device shown in FIG. 10.

Next, the operation of the first embodiment of the mechanism conceptional drawing transformation method according to the present invention will now be described. FIG. 9 is a structural view of a reel brake motion device of a magnetic tape recording and reproducing device. This structural view is shown as a form view of a conventional mechanical structure. One embodiment of a transformation of the form view to a mechanism conceptional view capable of readily recognizing mechanism operations and power transmission paths by using a mechanism conceptional drawing transformation method according to the present invention will be described as follows. Firstly, the structural view shown in FIG. 9 is processed in the above-described recognition step 1 shown in FIG. 2. The processing content is an inputting of a conventional structural view drawn on paper into a computer by using an image reader or the like provided in the input unit 27 shown in FIG. 8 in the form image reading step 7. The form data are converted into binary bit data and are displayed on the display unit 31 such as a CRT or the like shown in FIG. 8. In a usual structural view, many parts are often overlapping each other, and thus regarding the parts whose invisible lines are not shown and which are drawn by broken lines, they are overwritten in accordance with the instruction by the operation in the invisible line restoration step 8. As a result, FIG. 10 is obtained. Next, in order to decompose the overlapped figures in the decomposition instruction step 9, a plurality of figures to be decomposed are instructed by the operator.

Figure 16:
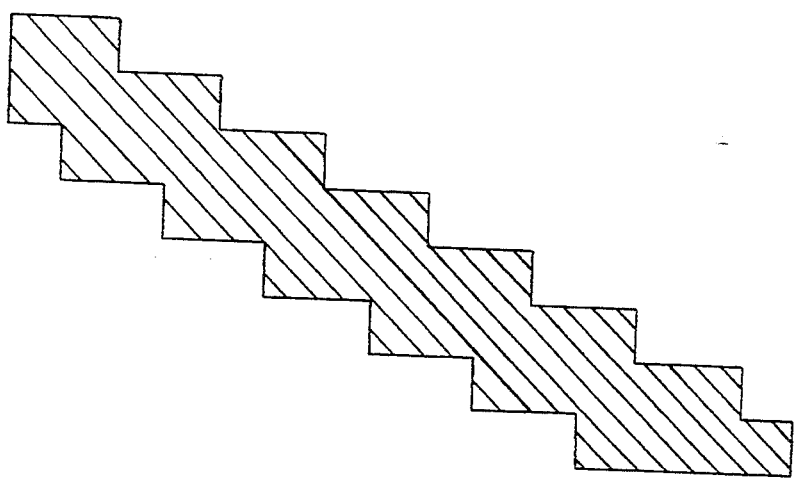
FIG. 16 is a view for explaining a line thinning process.
Figure 17:
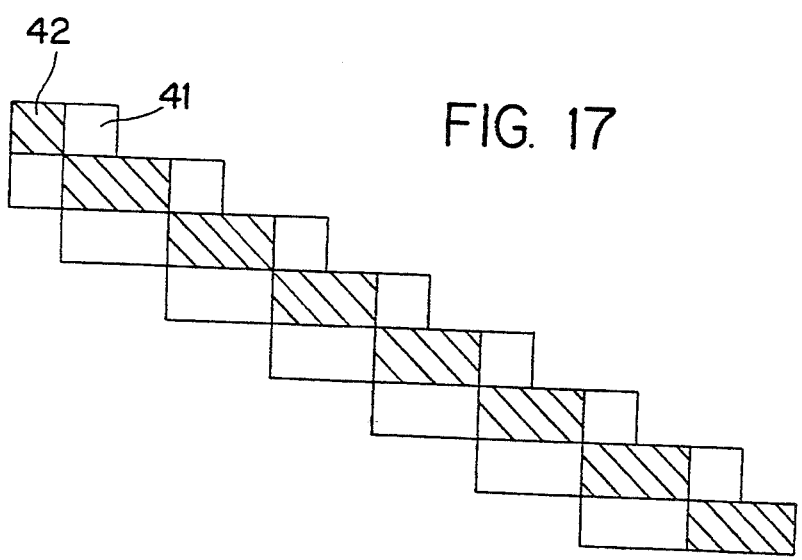
FIG. 17 is a view for explaining a line thinning process.

Next, the decomposition of the overlapped figures are processed in the decomposition step 2. The processing content is a decomposition in the figure decomposition step 10 on the basis of the data given in the decomposition instruction step 9. Accordingly, a reel brake motion device of a magnetic tape recording and reproducing device is decomposed into a reel block, a reel brake block and a brake control block as shown in FIG. 10, FIG. 11, FIG. 12 and FIG. 13. Further, for example, as shown in FIG. 14, a lever 40 is decomposed from within the brake control block. In the line thinning step 11, for instance, an outline of the above-described lever 40 is transformed to a thin line. As illustrated in the outline of the lever 40 in an enlarged view as shown in FIG. 15, the data just as the form image is read in exhibit a fairly thick line, as shown in an enlarged manner in FIG. 16. Then, as shown in FIG. 17, bit data 41 are removed from a border between black and white parts so that the process leaves bit data 42 of the central line of the thick line. In the line tracking step 12, how to connect the bit data of the thin line is determined. This can be realized by overlaying the central data of a 3×3 matrix 43 shown in FIG. 18 on the thin line. The matrix 43 can be moved in 8 directions indicated by arrows. For example, in FIG. 19, the matrix 43 is moved in a direction of an arrow 44. In the vector data formation step 13, the bit data are converted into vector data having start and end points. That is, as shown in FIG. 20, the bit data are scanned in order from the upper side in a direction 45 to select a starting point 46 to be the origin of a Figure. From this, how to connect the bit data is examined to generate a maximum vector 47 approximated as close as is possible to a straight line. Then, this processing is repeated from the end point of the previously obtained vector 47 as the starting point until the starting point is returned to the origin 46. In this process, a vector of a closed outline 48 is formed. Similarly, another starting point 49 is selected, and a vector of a closed outline 50 is obtained in the same manner as described above.

Figure 22:
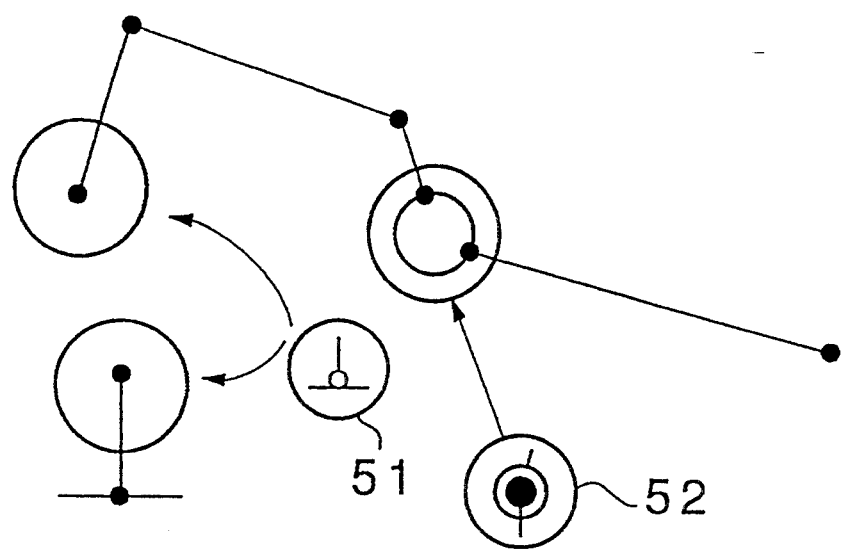
FIG. 22 is a view for explaining a process for selecting conceptional symbols corresponding to line drawings.
Figure 23:
FIG. 23 is a view for explaining a process for arranging the conceptional symbols.
Figure 24:
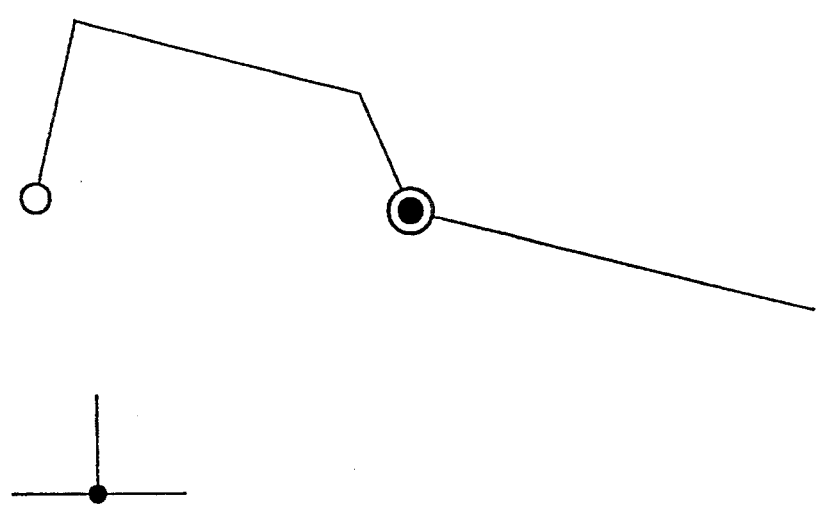
FIG. 24 is a view for explaining a process for connecting the conceptional symbols by segments.

Next, the processing is carried out in the symbolization step 3 in FIG. 1. The processing content is a classification of mechanical elements such as holes, gears, bearings and the like from the figure and a pattern recognition of the mechanical elements in the figure recognition step 14. In the figure line drawing formation step 15, a structural body is transformed into a wire form, and through the figure connection state and the figure connection state instruction step 16, a figure is drawn in the form of a wire frame, as shown in FIG. 21. Then, in the conceptional symbol selection step 17, conceptional symbols 51 and 52 are made to correspond to the elements expressed by the wire frame in the conceptional symbol selection step 17, as shown in FIG. 22. In the embodiment shown in FIG. 22, the conceptional symbol 51 shows a conception capable of contacting one end of a structural element with another member, and the conceptional symbol 52 shows a conception capable of being freely rotatable against an axis. These conceptional symbols are prepared in advance, and the conceptional symbols themselves can be determined at will. For instance, as shown in FIG. 23, the conceptional symbol 51 can be shown by a conceptional symbol 51a, and similarly the conceptional symbol 52 can be expressed by a conceptional symbol 52a. In the conceptional symbol arrangement step 18, the conceptional symbols are arranged and drawn as shown in FIG. 23. Next, the processing is performed in the line connection step 4 in FIG. 1. The processing content is a recognition of how to connect the conceptional symbols in the conceptional symbol connection recognition step 19 and a connection of the conceptional symbols with segments in the conceptional symbol line connection step 20. As a result, they are drawn as shown in FIG. 24.

Figure 25:
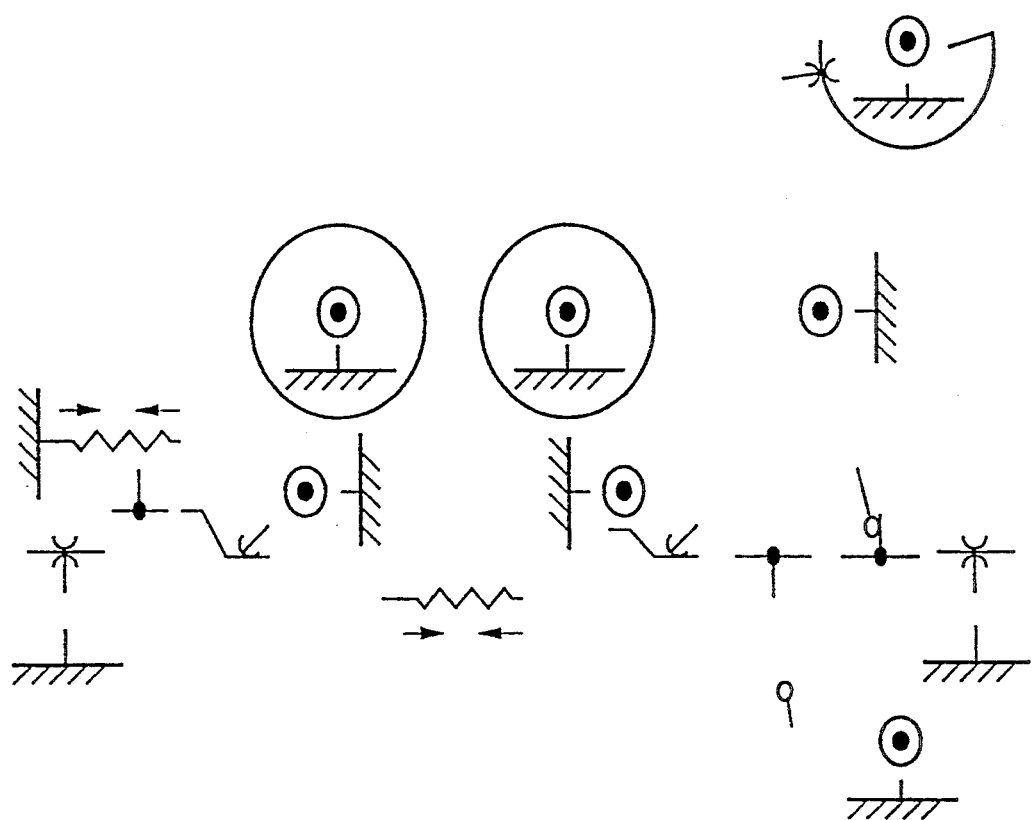
FIG. 25 is a view for explaining a process for arranging the conceptional symbols.
Figure 26:
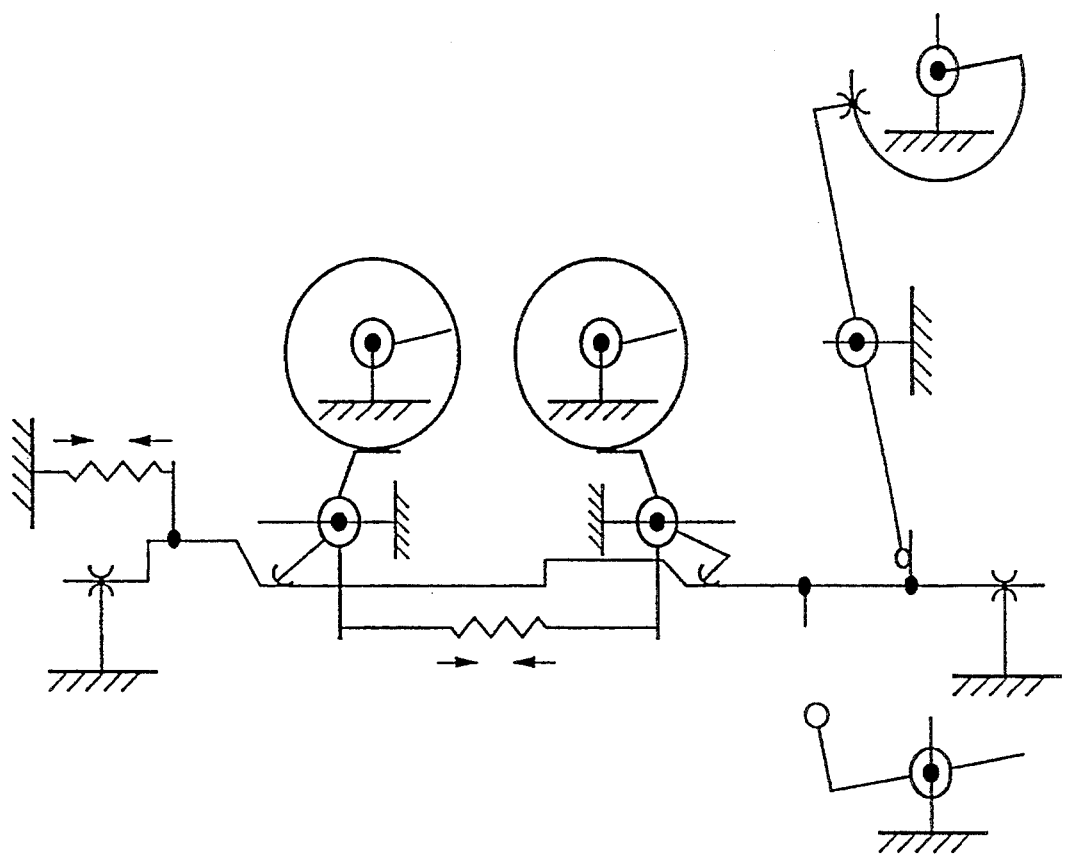
FIG. 26 is a view for explaining a process for connecting the conceptional symbols by segments.

In the reel brake motion device of the magnetic tape recording and reproducing device shown in FIG. 9, the mechanism conceptional view of the lever 40 described above is applied to the reel block, the reel brake block and the brake control block to obtain similar mechanism conceptional views, and these are arranged in a two-dimensional manner as shown in FIG. 25. Further, as shown in FIG. 26, these conceptional symbols are connected with the segments to transform the form view of the aforementioned mechanism structure shown in FIG. 10 into a two-dimensional flat mechanism conceptional view.

Figure 27:
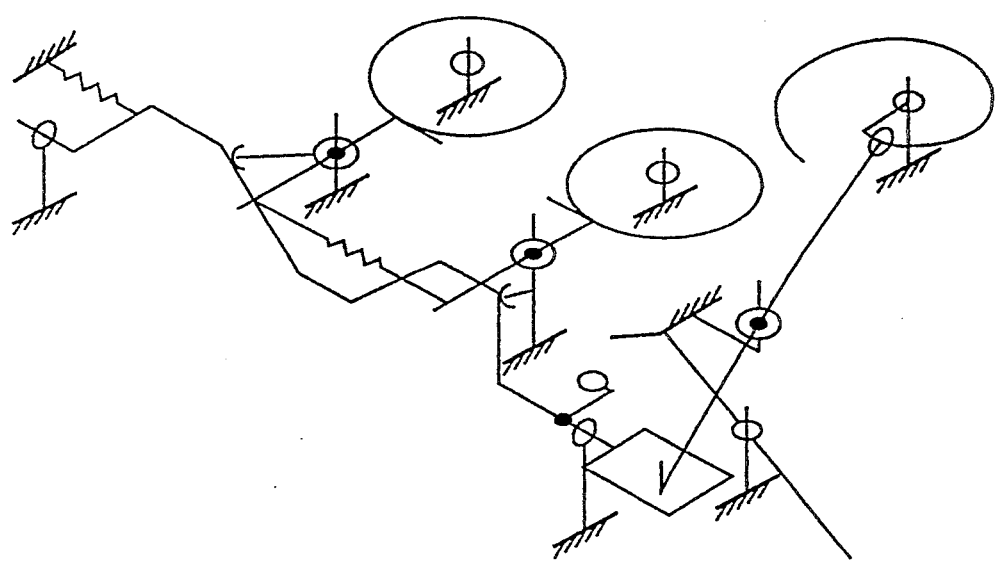
FIG. 27 is a view for explaining a process for transforming a conceptional view into a perspective view.

Next, the two-dimensional flat conceptional view is transformed into a perspective view in the perspective view formation step 5 in FIG. 1. The processing content is a transformation of the two-dimensional figure data into the perspective view in the perspective view coordinates transformation step 21 and a drawing of a conceptional view in the perspective view drawing step 22, to produce a drawing as shown in FIG. 27. In the end, operational symbols are drawn in the operational symbol addition step 6 in FIG. 1. The processing content is a selection of the symbols in the operational symbol selection step 23 and an arrangement of the selected symbols in the operational symbol arrangement step 24 and an expression of the relationship between the symbols and the movable members by index lines in the operational relation instruction step 25. As a result, a mechanism conceptional view is obtained as shown in FIG. 28.

Figure 28:
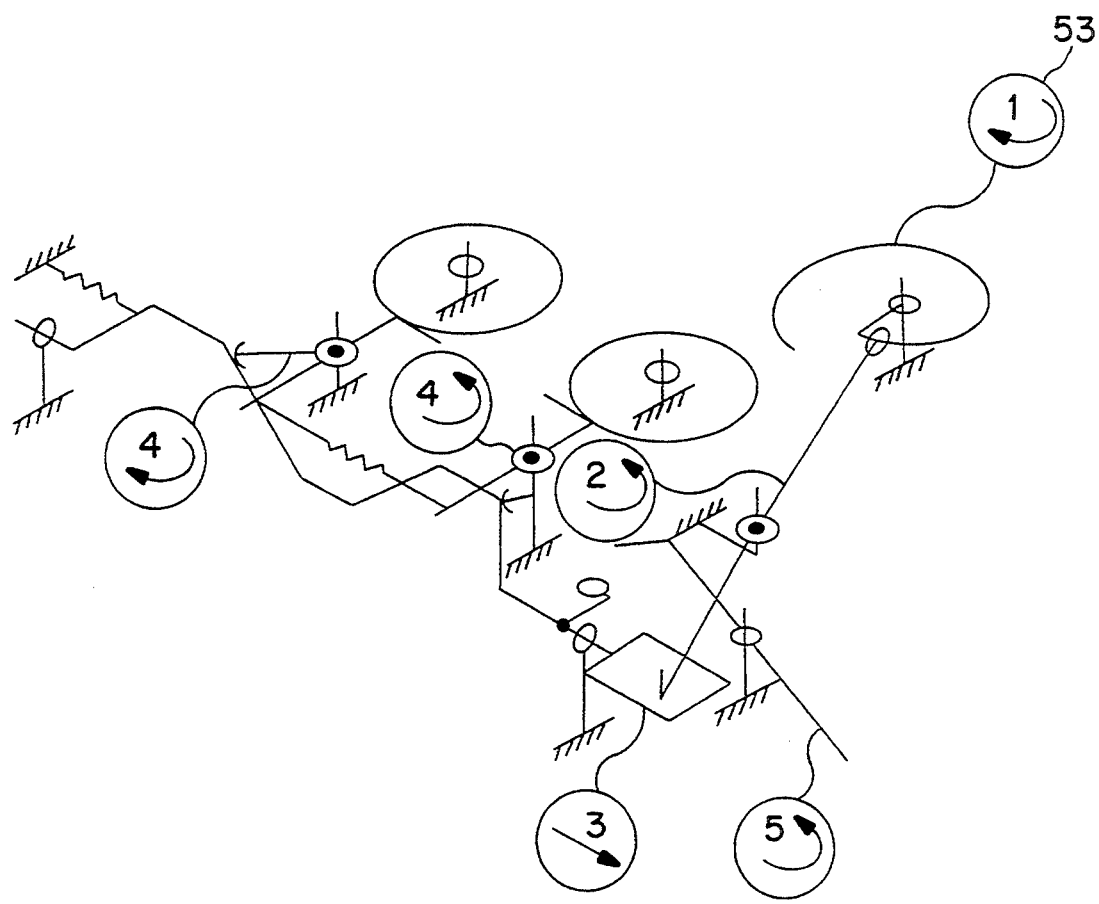
FIG. 28 is a view for explaining a process for adding the operational symbols to the conceptional view.

In FIG. 28, the operational symbols are shown by a symbol 53, and the transmission paths and directions of the operational symbols are numbered as 1, 2, 3, 4, 4 and 5 according to the power transmission paths of the operation of the reel brake.

Second Embodiment

The mechanism conceptional views obtained by the mechanism conceptional drawing transformation method according to the present invention can be applied to drawings for patent applications in addition to drawings for manufacturing. In particular, in the case of the patent drawings, it is necessary to understand a connection relationship among components, operations and power transmission paths rather than accurate form dimensions, in a short time and to quickly grasp their technical concept, and the roles performed by the mechanism conceptional views obtained by the present invention are extremely large.

Next, a process where that the present method is applied for forming patent drawings, will be described in detail.

A. Process for forming perspective conceptional drawings from current patent drawings:

(1) Understand how the components specified in the claims roughly operate.

(2) Draw the conceptional views corresponding to the claims according to the understood operations. At this time, it is unnecessary to draw the views by understanding the detailed operations.

(3) Understand the components of one embodiment. Also, roughly understand how the components operate.

(4) Understand the power transmission paths, and understand in which order the components operate. At this time, the detailed operations of the components are going to be understood.

(5) When the mechanism is complicated, divide the flows of the operations into a plurality of completed groups. However, it is preferable to exhibit them by possibly smaller blocks.

(6) For every block of the group of the operations, draw a perspective conceptional view having a wire-work form.

(7) Clearly write numbers on wire members, and inscribe the operational symbols with the numbers on the members with movement. The numbers are attached in order of the operation according to the power transmission paths understood in the line connection step 4 in FIG. 1.

(8) After drawing the conceptional view, inscribe names corresponding to the numbers of the members.

(9) While viewing this conceptional view, draw a flow diagram showing the flows of the operations one by one by brief expression on the basis of the operations of the components understood in the line connection step 4 in FIG. 1.

(10) If necessary, tile views corresponding to the claims of the decomposition step 2 in FIG. 1 may be corrected at this time.

B. Drawing process where the patent drawings are drawn using conceptional views from the beginning:

(1) Since a person drawing the conceptional view is an inventor and the components and their operations are stored in his head, the elements to be a core of the invention are extracted, and a claim conceptional view is drawn based on the extracted elements.

(2) Write sentences of the claims.

(3) Try to typically write the power transmission paths of one embodiment of this invention.

(4) When the mechanism is complicated, the flows of the operations are divided into a plurality of completed groups. However, it is preferable to exhibit them by possibly smaller blocks.

(5) For every block of the group of the operations, draw a perspective conceptional view having a wire-work form.

(6) Clearly write numbers on wire members, and inscribe the operational symbols with the numbers on the members with movement. The numbers are attached in order of the operations according to the power transmission paths arranged in the symbolization step 3 in FIG. 1.

(7) After drawing the conceptional view, inscribe names corresponding to the numbers of the members.

(8) While looking at this conceptional view, draw a flow diagram showing the flows of the operations one by one by brief expression.

(9) Write the detailed description of the composition of one embodiment, functions and the detailed description of the operations.

Figure 29:
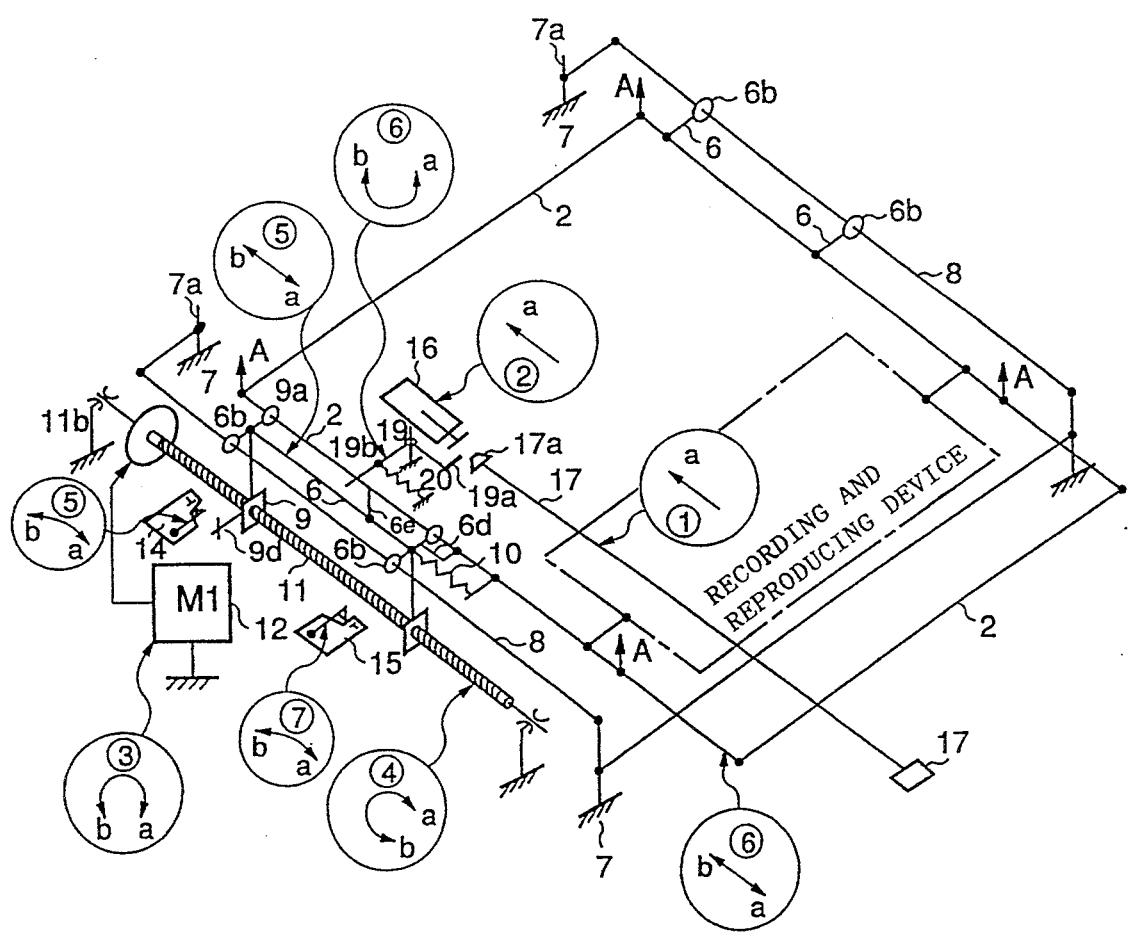
FIG. 29 is an explanatory view of a second embodiment of a mechanism conceptional drawing transformation method according to the present invention applied to a patent drawing, that is, a mechanism conceptional view of a mounting plate of a digital audio tape recorder and a sliding part.
Figure 30:
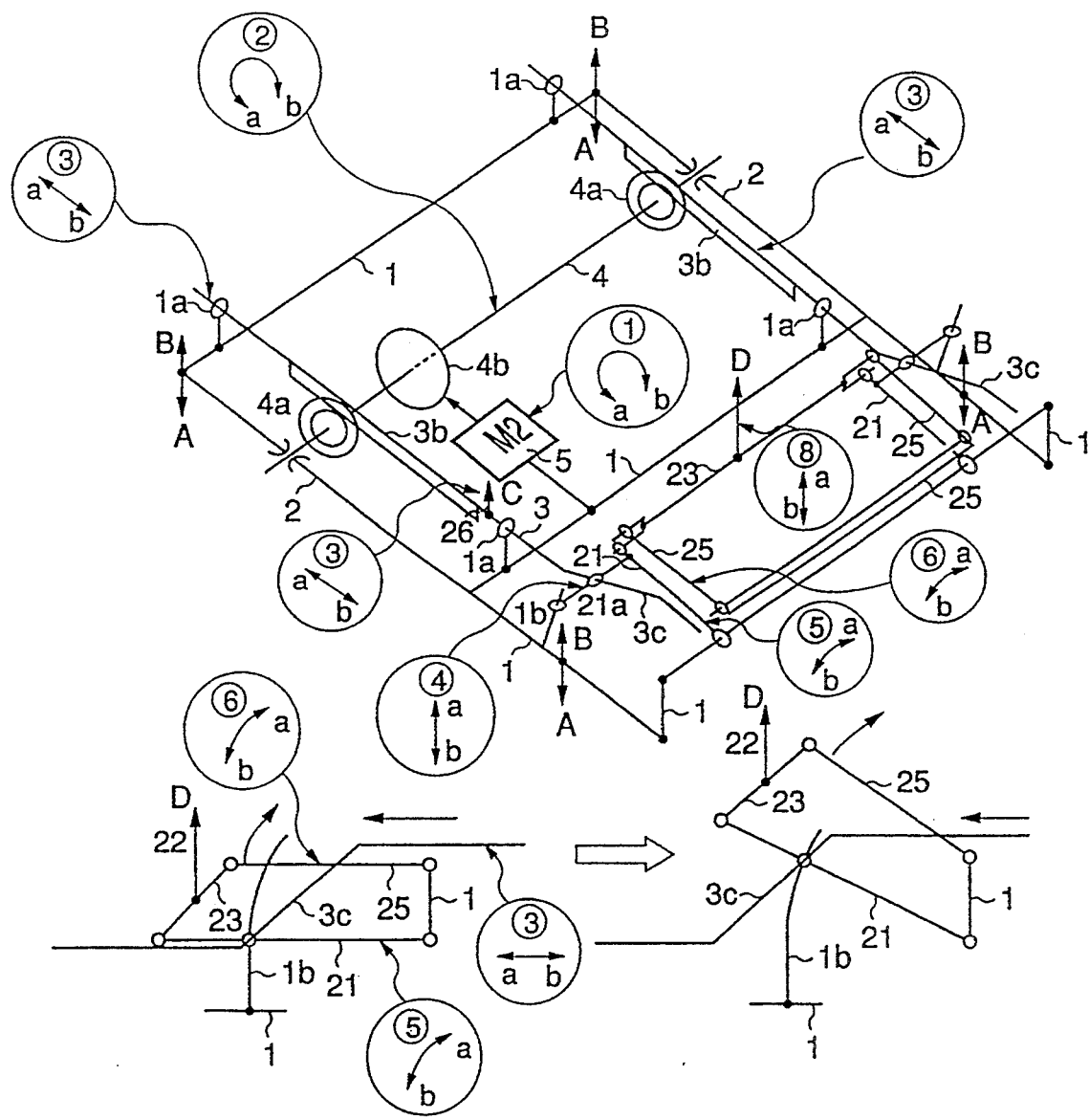
FIG. 30 is a mechanism conceptional view of a part for moving a second cassette holder up and down in the second embodiment of the mechanism conceptional drawing transformation method according to the present invention.
Figure 31:
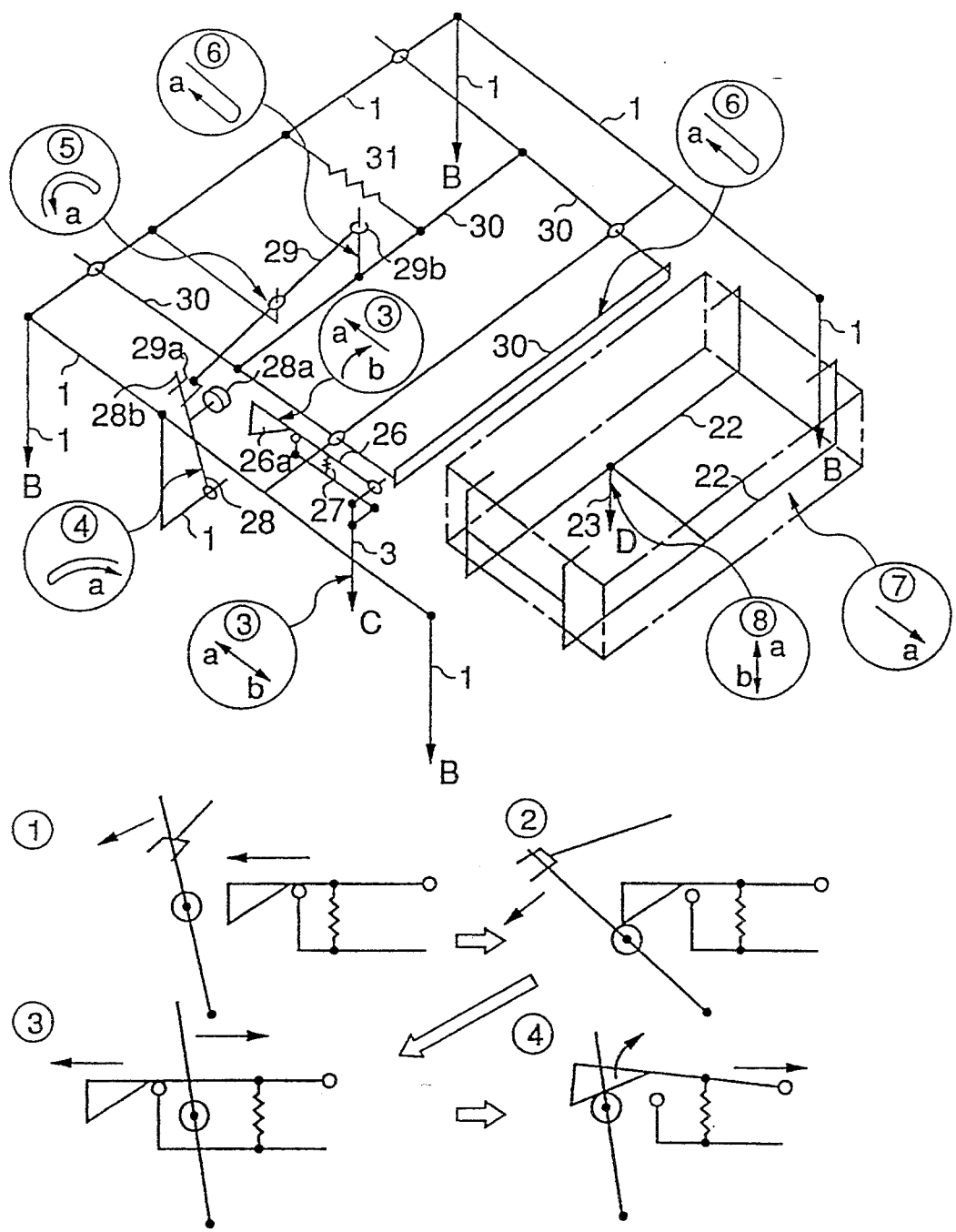
FIG. 31 is a mechanism conceptional view of a part for taking out a cassette from a first cassette holder in the second embodiment of the mechanism conceptional drawing transformation method according to the present invention.

FIG. 29 to FIG. 31 are mechanism conceptional views exhibiting cassette mounting mechanisms of a digital audio tape recorder, formed by the above-described mechanism conceptional drawing transformation method according to the present invention on the basis of FIG. 1 of Japanese Patent Laid-Open No. Sho 63-44349. A process for forming the conceptional views will now be described.

In FIG. 1 of Japanese Patent Laid-Open No. Sho 63-44349, there is shown an assembling view of the above-described mechanism. From this view, operations of the mechanism elements are roughly understood. Next, power transmission paths for transmitting the operations from a power source are understood (the recognition step 1). The mechanism operations are divided from the power transmission paths (the decomposition step 2). In this embodiment, the mechanism operations are divided into three blocks, that is, a sliding part with a mounting plate, a part for moving a second cassette up and down and a part for taking out a cassette from a first cassette holder. The divided three blocks are drawn to obtain perspective conceptional views each composed of element symbols and segments for connecting the element symbols, as shown in FIGS. 29 to 31. At the time that the above-described perspective conceptional views are drawn, and operational symbols for exhibiting the operations of the elements are added.

That is, similar to the above-described first embodiment, the patent views are decomposed into characteristic mechanism operations of groups, and each block is symbolized (the symbolization step 3). These symbols are prepared as the conceptional symbols in advance, and in particular, the conceptional symbols can be determined to lay emphasis on the operations of the components.

Further, these conceptional symbols are connected to each other with segments (the line connection step 4), and a line connection view capable of understanding the mechanism operations can be obtained for each block. In the present invention, these line connection views are transformed into the perspective views in the perspective view formation step 5. However, in the case of the patent drawings, many views are originally expressed by the perspective views, and in such a case, this step can be omitted.

Finally, the operation of every block according to the power transmission paths is written in order in the operational symbol addition step 6, and hence the entire mechanism operations can be obtained in an extremely understandable form.

Furthermore, in the patent drawings, it is preferable to inscribe the symbols of the components and their names in each view.

Industrial Applicability

As described above, according to the present invention, it is possible to obtain the mechanism conceptional drawings capable of understanding the operations of the mechanism from the form drawing data of the mechanical structure by a simple operation.

I claim:

1. A method of transforming mechanical drawings into conceptual drawings, comprising the steps of:
   (a) imaging a mechanical drawing using an input unit;
   (b) receiving, via said input unit, operator instructions about mechanical operations and power transmission paths for a mechanism illustrated in said mechanical drawing;
   (c) decomposing said image of said mechanical drawing into a plurality of figures based on said operator instructions received in said step (b) using a processing means;
   (d) receiving operator instructions about conceptual symbols associated with components in said plurality of figures via said input unit, said conceptual symbols conceptually representing structural elements of said mechanism;
   (e) creating an intermediate conceptual drawing corresponding to said mechanical drawing based on said operator instructions received in said step (d) using said processing means; said intermediate conceptual drawing including said conceptual symbols positionally arranged in a manner corresponding to said components in said plurality of figures;

(f) receiving operator instructions about connections between said components in said plurality of figures via said input means;

(g) adding line connections connecting said conceptual symbols according to said operator instructions received in said step (f) to create a two-dimensional line connection image using said processing means;

(h) receiving operator instructions about converting said two-dimensional line connection image into a perspective view conceptual drawing via said input means;

(i) converting said two-dimensional line connection image into said perspective view conceptual drawing in accordance with said operator instructions received in said step (h) using said processing means; and (j) receiving operator instructions about operations associated with said conceptual symbols via said input means; and (k) creating a conceptual drawing based on said perspective view conceptual drawing and said operator instructions received in said step (j) using said processing means.

2. The method of claim 1, wherein components of said mechanism overlap other components creating overlapped parts such that said overlapped parts are not shown in said mechanical drawing; and wherein said method further comprises the steps of, (l) receiving image data from an operator via said input unit; and (m) completing an image of said mechanical drawing obtained in said step (a) by drawing in said overlapped parts of said mechanism based on said image data; and wherein said step (b) includes receiving operator instructions about mechanical operations and power transmission paths for said overlapped parts of said mechanism.

3. The method of claim 1, wherein said step (c) includes the steps of:

(c1) decomposing said mechanical drawing into a plurality of figures based on said operator instruction received in said step (b) using said processing means;

(c2) receiving operator instructions, via said input unit, about reducing line thickness of lines in said plurality of figures;

(c3) thinning lines in said plurality of figures in accordance with said operator instructions received in step (c2) using said processing means;

(c4) scanning, with said processing means, figures output in said step (c3) to recognize connections between segments in said figures output in said step (c3); and (c5) transforming said segments into vector data having start points and end points using said processing means.

4. The method of claim 1, wherein said step (d) includes the steps of (d1) receiving operator instructions about simplifying said plurality of figures into wire form via said input unit, (d2) receiving operator instructions regarding a connection state between said plurality of figures via said input unit, and (d3) receiving operator instructions regarding conceptual symbols associated with components in said plurality of figures via said input unit; and said step (e) includes the steps of arranging and drawing, with said processing means, said conceptual symbols to create an intermediate conceptual drawing corresponding to said mechanical drawing based on said operator instructions received in said steps (d1), (d2), and (d3).

5. The method of claim 1, wherein said step (i) includes the steps of (i1) converting coordinates of image data in said two-dimensional line connection view into coordinates of image data in said perspective view conceptual drawing, and (i2) drawing said perspective view conceptual drawing.

6. The method of claim 1, wherein said step (j) includes receiving operator instructions about directions of operation of certain ones of said associated components; and said step (k) includes the steps of (k1) drawing a symbol representing said directions of operation on said perspective view conceptual drawing, and (k2) indicating in said drawing to which conceptual symbols said symbols representing said directions of operation correspond.

7. The method of claim 1, furthering comprising the steps of (l) displaying the output of at least one of steps (a), (c), (e), (g), (i), and (k) on a display unit.

* * * * *